(12) United States Patent
Ding et al.

(10) Patent No.: US 10,372,325 B2
(45) Date of Patent: Aug. 6, 2019

(54) ELECTROMYOGRAPHIC BASED TOUCH INTERACTION PROCESSING METHOD, DEVICE, AND SYSTEM

(71) Applicant: HUAWEI TECHNOLOGIES CO., LTD., Shenzhen, Guangdong (CN)

(72) Inventors: Qiang Ding, Beijing (CN); Xiaorong Gao, Beijing (CN); Xiaoshan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 15/486,452

(22) Filed: Apr. 13, 2017

(65) Prior Publication Data
US 2017/0220245 A1   Aug. 3, 2017

Related U.S. Application Data

(63) Continuation of application No. PCT/CN2015/080243, filed on May 29, 2015.

(30) Foreign Application Priority Data

Oct. 16, 2014 (CN) .......................... 2014 1 0549003

(51) Int. Cl.
   *G06F 3/041*     (2006.01)
   *G06F 3/0488*   (2013.01)
   *G06F 3/01*      (2006.01)

(52) U.S. Cl.
   CPC .......... *G06F 3/04883* (2013.01); *G06F 3/015* (2013.01); *G06F 3/017* (2013.01);
   (Continued)

(58) Field of Classification Search
   None
   See application file for complete search history.

(56) References Cited

U.S. PATENT DOCUMENTS 8,022,941 B2   9/2011  Smoot
8,292,833 B2   10/2012 Son et al.
(Continued)

FOREIGN PATENT DOCUMENTS

CN   102117150 A   7/2011
CN   102184056 A   9/2011
(Continued)

OTHER PUBLICATIONS

International Search Report dated Aug. 26, 2015 in corresponding International Application No. PCT/CN2015/080243.
(Continued)

*Primary Examiner* — Lunyi Lao
*Assistant Examiner* — Kirk W Hermann
(74) *Attorney, Agent, or Firm* — Staas & Halsey LLP (57) ABSTRACT

A touch interaction processing method, device, and system. The touch interaction processing method includes: receiving first information sent by an electromyographic signal collection device and second information sent by a location capturing device (101); if it is determined that a time gap between a first touch start time and a second touch start time is less than a preset threshold, and a quantity of touch points that is corresponding to a hand gesture is the same as a quantity of touch points that is included in the second information, generating a touch instruction, where the touch instruction includes a device identifier of the electromyographic signal collection device, the hand gesture, and coordinate information of each touch point (103); and performing an interaction operation corresponding to the touch instruction (105).

20 Claims, 4 Drawing Sheets

(52) U.S. Cl.
CPC .......... *G06F 3/041* (2013.01); *G06F 3/0418* (2013.01); *G06F 3/0488* (2013.01); *G06F 2203/04104* (2013.01); *G06F 2203/04105* (2013.01); *G06F 2203/04808* (2013.01)

(56) References Cited

U.S. PATENT DOCUMENTS

| | | |
|---|---|---|
| 8,441,467 B2 | 5/2013 | Han |
| 8,581,856 B2 | 11/2013 | Benko et al. |
| 8,614,666 B2 | 12/2013 | Whitman et al. |
| 8,692,799 B1 | 4/2014 | Landry et al. |
| 2010/0302137 A1* | 12/2010 | Benko .................... G06F 3/005 345/156 |
| 2010/0310136 A1 | 12/2010 | Tsuda |
| 2011/0069039 A1 | 3/2011 | Lee et al. |
| 2013/0278507 A1 | 10/2013 | Hintermeister |
| 2013/0310136 A1 | 11/2013 | Kitamura et al. |
| 2014/0009417 A1 | 1/2014 | Sugimoto |
| 2014/0210745 A1 | 7/2014 | Chizeck et al. |

FOREIGN PATENT DOCUMENTS

| | | |
|---|---|---|
| CN | 102449573 A | 5/2012 |
| JP | 7-248873 | 9/1995 |
| JP | 2004-534974 | 11/2004 |
| JP | 2005-43954 | 2/2005 |
| JP | 2014-16795 | 1/2014 |
| WO | 02/35460 A1 | 5/2002 |
| WO | 2013/103344 A1 | 7/2013 |
| WO | 2013/134091 A1 | 9/2013 |

OTHER PUBLICATIONS

Japanese Notice of Allowance dated May 15, 2018, in corresponding Japanese Patent Application No. 2017-520458, 3 pgs.
Notice of Allowance, dated Apr. 12, 2018, in Korean Application No. 10-2017-7012912 (3 pp.).
International Search Report dated Aug. 26, 2015 in corresponding International Patent Application No. PCT/CN2015/080243.
Chris Harrison et al. "Capacitive Fingerprinting: Exploring User Differentiation by Sensing Electrical Properties of the Human Body" UIST '12, (Oct. 7-10, 2012).
Extended European Search Report dated Aug. 21, 2017 in corresponding European Patent Application No. 15851451.3.

* cited by examiner

ELECTROMYOGRAPHIC BASED TOUCH INTERACTION PROCESSING METHOD, DEVICE, AND SYSTEM

CROSS-REFERENCE TO RELATED APPLICATIONS

This application is a continuation of International Application No. PCT/CN2015/080243, filed on May 29, 2015, which claims priority to Chinese Patent Application No. 201410549003.0, filed on Oct. 16, 2014. The disclosures of the aforementioned applications are hereby incorporated by reference in their entireties.

TECHNICAL FIELD

Embodiments of the present disclosure relate to the field of man-machine interaction, and in particular, to a touch interaction processing method, device, and system.

BACKGROUND

A touch technology is one of key technologies for man-machine interaction, and is classified into a single-touch technology and a multi-touch technology according to a quantity of touch points. The single-touch technology can identify and support a tap or a touch performed using only one finger each time. The multi-touch technology is also referred to as a multi-touch and multi-point sensing technology, and can simultaneously collect a multi-point signal and identify a gesture, so as to implement identification and support of a tap or a touch action performed by simultaneously using five fingers. Because a touch operation is convenient, natural, and user-friendly, the touch operation is widely applied to various fields.

In the prior art, a touch instruction is identified by detecting a touch point on an interface: one touch point indicates a single-touch operation, and multiple touch points indicates a multi-touch operation, but a user that performs a touch operation and a hand and fingers that are used to perform the touch operation cannot be identified. When a single user performs a multi-touch operation with a single hand, because fingers cannot be identified, only a few multi-touch instructions can be identified, for example, a movement performed using an index finger and a thumb and a movement performed using a middle finger and a thumb are both identified as a scaling operation. When a single user performs a touch operation with two hands, because the left hand and the right hand cannot be identified, a confusing touch instruction is easily caused, for example, simultaneous movements of a single finger of the left hand and a single finger of the right hand are incorrectly identified as a scaling operation performed using an index finger and a thumb of a single hand. When multiple users perform touch operations, because the users cannot be identified, it cannot be implemented that multiple users simultaneously perform touch operations in a same region.

In conclusion, the prior art has the following disadvantage: A confusing touch instruction is easily caused when a single user performs a touch operation with two hands or when multiple users simultaneously perform touch operations in a same region.

SUMMARY

Embodiments of the present disclosure provide a touch interaction processing method, device, and system, so as to implement that a single user performs a touch interaction operation with two hands or multiple users simultaneously perform touch interaction operations in a same region.

According to a first aspect, an embodiment of the present disclosure provides a touch interaction processing method, including:

receiving first information sent by an electromyographic signal collection device and second information sent by a location capturing device, where the first information includes a device identifier of the electromyographic signal collection device, a hand gesture in which a user performs a touch, and a first touch start time; the second information includes a quantity of touch points at which the user performs the touch, a second touch start time, and coordinate information of each touch point; the first touch start time is a start time at which the user performs a touch operation and that is identified by the electromyographic signal collection device; and the second touch start time is a start time at which the user performs the touch operation and that is identified by the location capturing device;

if it is determined that a time gap between the first touch start time and the second touch start time is less than a preset threshold, and a quantity of touch points that is corresponding to the hand gesture is the same as the quantity of the touch points that is included in the second information, generating a touch instruction, where the touch instruction includes the device identifier of the electromyographic signal collection device, the hand gesture, and the coordinate information of each touch point; and performing an interaction operation corresponding to the touch instruction.

With reference to the first aspect, in a first possible implementation manner of the first aspect, the method further includes:

continuously receiving the hand gesture in which the user performs the touch and that is sent by the electromyographic signal collection device, and the coordinate information of each touch point that is sent by the location capturing device; and updating the touch instruction.

With reference to the first aspect, in a second possible implementation manner of the first aspect, the first information further includes operating force at which the user performs the touch, and the touch instruction further includes the operating force.

With reference to the second possible implementation manner of the first aspect, in a third possible implementation manner of the first aspect, the method further includes: continuously receiving the hand gesture in which the user performs the touch and the operating force at which the user performs the touch that are sent by the electromyographic signal collection device, and the coordinate information of each touch point that is sent by the location capturing device; and updating the touch instruction.

With reference to the third possible implementation manner of the first aspect, in a fourth possible implementation manner of the first aspect, the method further includes: if it is determined that the operating force is less than a second preset threshold, deleting the touch instruction.

According to a second aspect, an embodiment of the present disclosure provides a touch interaction processing method, including:

periodically collecting, by an electromyographic signal collection device, surface electromyographic signals S1 from multiple channels;

determining, by the electromyographic signal collection device according to a time-frequency domain feature of the surface electromyographic signals S1, a hand gesture in which a user performs a touch; and determining a first touch start time according to the hand gesture, where the first touch start time is a start time at which the user performs a touch operation and that is identified by the electromyographic signal collection device; and sending, by the electromyographic signal collection device, first information to a processing device, such that the processing device generates a touch instruction according to the first information and second information that is sent by a location capturing device, and performs a corresponding interaction operation, where the first information includes a device identifier of the electromyographic signal collection device, the hand gesture, and the first touch start time; the second information includes a quantity of touch points at which the user performs the touch, a second touch start time, and coordinate information of each touch point; and the second touch start time is a start time at which the user performs the touch operation and that is identified by the location capturing device.

With reference to the second aspect, in a first possible implementation manner of the second aspect, the determining, by the electromyographic signal collection device according to a time-frequency domain feature of the surface electromyographic signals S1, a hand gesture in which a user performs a touch includes: determining, by the electromyographic signal collection device, the hand gesture according to an amplitude and a frequency that are of the surface electromyographic signals S1 based on a type of a hand gesture.

With reference to the second aspect, in a second possible implementation manner of the second aspect, the method further includes: determining, by the electromyographic signal collection device according to the time-frequency domain feature of the surface electromyographic signals S1, operating force at which the user performs the touch, where the first information further includes the operating force, and the determining a first touch start time according to the hand gesture is determining the first touch start time according to the hand gesture and the operating force.

With reference to the second possible implementation manner of the second aspect, in a third possible implementation manner of the second aspect, the determining operating force at which the user performs the touch includes: obtaining, by the electromyographic signal collection device, a single channel electromyographic signal S2 by performing superposition and averaging on the surface electromyographic signals S1, calculating an average amplitude of the single channel electromyographic signal S2 using a sliding time window, and using the average amplitude of the single channel electromyographic signal S2 as the operating force S.

With reference to the second possible implementation manner of the second aspect, in a fourth possible implementation manner of the second aspect, the determining the first touch start time according to the hand gesture and the operating force includes: after acquiring the hand gesture and the operating force, determining the first touch start time by looking up a table, where a first preset threshold of operating force corresponding to each hand gesture is pre-stored in the table; and if the operating force acquired according to the surface electromyographic signals S1 is greater than the first preset threshold, acquiring a current system time, and using the current system time as the first touch start time.

With reference to the second aspect or any one of the first to the fourth possible implementation manners of the second aspect, in a fifth possible implementation manner of the second aspect, that the processing device generates a touch instruction according to the first information and second information that is sent by a location capturing device includes: after determining that a time gap between the first touch start time and the second touch start time is less than a preset threshold, and a quantity of touch points that is corresponding to the hand gesture is the same as the quantity of the touch points that is included in the second information, the processing device generates the touch instruction.

According to a third aspect, an embodiment of the present disclosure provides a processing device, including:

an information receiving module, configured to receive first information sent by an electromyographic signal collection device and second information sent by a location capturing device, where the first information includes a device identifier of the electromyographic signal collection device, a hand gesture in which a user performs a touch, and a first touch start time; the second information includes a quantity of touch points at which the user performs the touch, a second touch start time, and coordinate information of each touch point; the first touch start time is a start time at which the user performs a touch operation and that is identified by the electromyographic signal collection device; and the second touch start time is a start time at which the user performs the touch operation and that is identified by the location capturing device;

an instruction generation module, configured to: if it is determined that a time gap between the first touch start time and the second touch start time is less than a preset threshold, and a quantity of touch points that is corresponding to the hand gesture is the same as the quantity of the touch points that is included in the second information, generate a touch instruction, where the touch instruction includes the device identifier of the electromyographic signal collection device, the hand gesture, and the coordinate information of each touch point; and an instruction execution module, configured to perform an interaction operation corresponding to the touch instruction.

With reference to the third aspect, in a first possible implementation manner of the third aspect, the instruction generation module is further configured to update the touch instruction according to the hand gesture in which the user performs the touch, that is sent by the electromyographic signal collection device, and that is continuously received by the information receiving module, and the coordinate information of each touch point that is sent by the location capturing device.

With reference to the third aspect, in a second possible implementation manner of the third aspect, the first information further includes operating force at which the user performs the touch, and the touch instruction further includes the operating force.

With reference to the second possible implementation manner of the third aspect, in a third possible implementation manner of the third aspect, the instruction generation module is further configured to update the touch instruction according to the hand gesture in which the user performs the touch and the operating force at which the user performs the touch that are sent by the electromyographic signal collection device and that are continuously received by the information receiving module, and the coordinate information of each touch point that is sent by the location capturing device.

With reference to the third possible implementation manner of the third aspect, in a fourth possible implementation manner of the third aspect, the instruction generation module is further configured to: if it is determined that the operating force is less than a second preset threshold, determine that the touch instruction ends, and delete the touch instruction.

According to a fourth aspect, an embodiment of the present disclosure provides an electromyographic signal collection device, including:

a collection module, configured to periodically collect surface electromyographic signals S1 from multiple channels;

a processing module, configured to determine, according to a time-frequency domain feature of the surface electromyographic signals S1, a hand gesture in which a user performs a touch; and determine a first touch start time according to the hand gesture, where the first touch start time is a start time at which the user performs a touch operation and that is identified by the electromyographic signal collection device; and a sending module, configured to send first information to a processing device, such that the processing device generates a touch instruction according to the first information and second information that is sent by a location capturing device, and performs a corresponding interaction operation, where the first information includes a device identifier of the electromyographic signal collection device, the hand gesture, and the first touch start time; the second information includes a quantity of touch points at which the user performs the touch, a second touch start time, and coordinate information of each touch point; and the second touch start time is a start time at which the user performs the touch operation and that is identified by the location capturing device.

With reference to the fourth aspect, in a first possible implementation manner of the fourth aspect, that a processing module determines, according to a time-frequency domain feature of the surface electromyographic signals S1, a hand gesture in which a user performs a touch includes: the processing module determines the hand gesture according to an amplitude and a frequency that are of the surface electromyographic signals S1 based on a type of a hand gesture.

With reference to the fourth aspect, in a second possible implementation manner of the fourth aspect, the processing module is further configured to determine, according to the time-frequency domain feature of the surface electromyographic signals S1, operating force at which the user performs the touch, where the first information further includes the operating force, and the determining a first touch start time according to the hand gesture is determining the first touch start time according to the hand gesture and the operating force.

With reference to the second possible implementation manner of the fourth aspect, in a third possible implementation manner of the fourth aspect, that the processing module determines operating force at which the user performs the touch includes: the processing module obtains a single channel electromyographic signal S2 by performing superposition and averaging on the surface electromyographic signals S1, calculates an average amplitude of the single channel electromyographic signal S2 using a sliding time window, and uses the average amplitude of the single channel electromyographic signal S2 as the operating force S.

With reference to the third possible implementation manner of the fourth aspect, in a fourth possible implementation manner of the fourth aspect, that the processing module determines the first touch start time according to the hand gesture and the operating force includes: after acquiring the hand gesture and the operating force, the processing module determines the first touch start time by looking up a table, where a first preset threshold of operating force corresponding to each hand gesture is pre-stored in the table; and if the operating force acquired according to the surface electromyographic signals S1 is greater than the first preset threshold, acquires a current system time, and uses the current system time as the first touch start time.

With reference to the fourth aspect or any one of the first to the fourth possible implementation manners of the fourth aspect, in a fifth possible implementation manner of the fourth aspect, that the processing device generates a touch instruction according to the first information and second information that is sent by a location capturing device includes: after determining that a time gap between the first touch start time and the second touch start time is less than a preset threshold, and a quantity of touch points that is corresponding to the hand gesture is the same as the quantity of the touch points that is included in the second information, the processing device generates the touch instruction.

According to a fifth aspect, an embodiment of the present disclosure provides a touch processing system, including a location capturing device, the processing device according to the third aspect or any one of the first to the fourth possible implementation manners of the third aspect, and at least one electromyographic signal collection device according to the fourth aspect and any one of the first to the fifth possible implementation manners of the fourth aspect, where the electromyographic signal collection device and the location capturing device are both communicatively connected to the processing device.

According to the touch interaction processing method, device, and system that are provided in the embodiments of the present disclosure, a touch instruction is generated according to first information sent by an electromyographic signal collection device and second information sent by a location capturing device, and a corresponding interaction operation is performed. Because a device identifier corresponding to the electromyographic signal collection device may be used to distinguish between one of touch operations that are performed by different users and a touch operation that is performed by a same user using the left hand and the right hand, it is implemented that a single user performs a touch operation with two hands or multiple users simultaneously perform touch operations in a same region without causing a confusing touch instruction.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
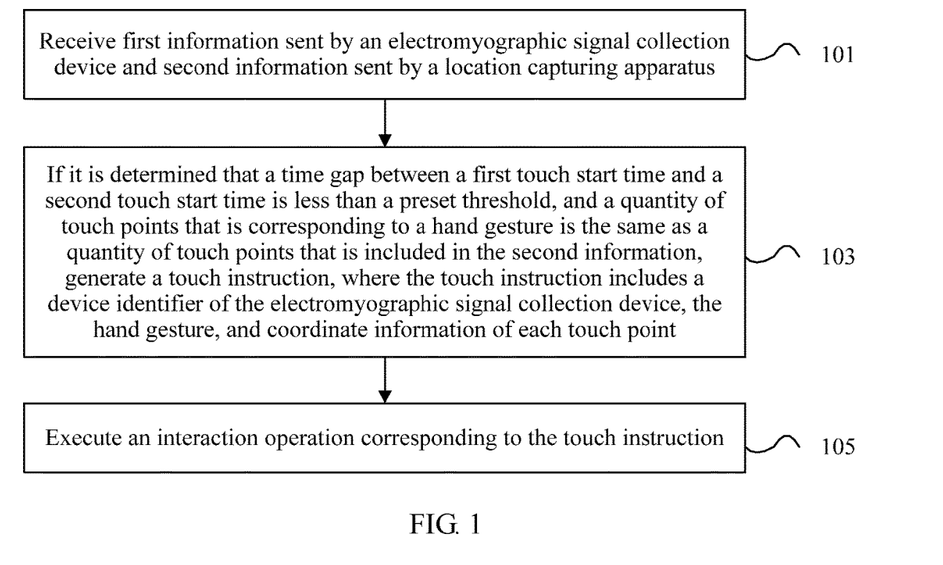
FIG. 1 is a flowchart of a first embodiment of a touch interaction processing method according to the present disclosure.

FIG. 1 is a flowchart of a first embodiment of a touch interaction processing method according to the present disclosure. The touch interaction processing method may be executed by a processing device, such as a chip or a mobile terminal. The processing device may be integrated into a processing device, and the processing device may be a mobile terminal, a computer, a server, or the like, and the chip may be integrated into a mobile terminal, a computer, or the like. The processing device and the processing device may be any device and device that have a storage or calculation function, which are not limited in this embodiment of the present disclosure. As shown in FIG. 1, the touch interaction processing method may include:

Step 101: Receive first information sent by an electromyographic signal collection device and second information sent by a location capturing device.

The first information includes a device identifier of the electromyographic (electromyographic, EMG for short) signal collection device, a hand gesture in which a user performs a touch, and a first touch start time. The second information includes a quantity of touch points at which the user performs the touch, a second touch start time, and coordinate information of each touch point. The first touch start time is a start time at which the user performs a touch operation and that is identified by the electromyographic signal collection device. The second touch start time is a start time at which the user performs the touch operation and that is identified by the location capturing device.

In this embodiment, the electromyographic signal collection device and the location capturing device may separately identify a touch operation event of the user in a same touch operation region. It should be noted that the electromyographic signal collection device may be any device that can collect a multichannel surface electromyographic (surface electromyographic, sEMG for short) signal. Preferably, the electromyographic signal collection device may be disposed on an arm of the user, and the location capturing device may be any device that can identify the touch operation of the user. The touch operation event of the user that is identified by the electromyographic signal collection device may be defined as an electromyographic touch event Touch_EMG. The touch operation event of the user that is identified by the location capturing device may be defined as a track touch event Touch_TrackSys. The electromyographic touch event Touch_EMG includes three parameters, which are respectively: the device identifier (device ID) of the electromyographic signal collection device, the hand gesture (G) in which the user performs the touch, and the first touch start time (T1). The track touch event Touch_TrackSys includes three parameters, which are respectively: the quantity (N2) of the touch points at which the user performs the touch, the second touch start time (T2), and the coordinate information (L) of each touch point.

The device ID may be used to uniquely distinguish between electromyographic signal collection devices. The device ID may be a number, a letter, or in any other form, which is not limited in this embodiment of the present disclosure. For example, when two users simultaneously perform touch operations, a user A uses both the left hand and the right hand to perform a touch operation, and a user B uses only the right hand to perform a touch operation, an electromyographic signal collection device needs to be disposed on each arm of the users. An electromyographic signal collection device with a device ID 210 collects a multichannel surface electromyographic signal of the left hand of the user A, an electromyographic signal collection device with a device ID 211 collects a multichannel surface electromyographic signal of the right hand of the user A, and an electromyographic signal collection device with a device ID 220 collects a multichannel surface electromyographic signal of the right hand of the user B. Because the device ID 210, the device ID 211, and the device ID 220 may be used to uniquely distinguish between different electromyographic signal collection devices, a touch operation performed by the user A using the left hand, a touch operation performed by the user A using the right hand, and the touch operation performed by the user B using the right hand may be identified. Therefore, the device identifier of the electromyographic signal collection device can be used to distinguish between one of touch operations that are performed by different users and a touch operation that is performed by a same user using the left hand and the right hand, such that it can be implemented that a single user performs a touch operation with two hands or multiple users simultaneously perform touch operations in a same region without causing a confusing touch operation.

The hand gesture G in which the user performs the touch may be a hand gesture of a single finger of a single hand, or may be a hand gesture of multiple fingers of a single hand. A corresponding quantity (N1) of touch points may be determined according to the hand gesture G. For example, the hand gesture of a single finger of a single hand may be a hand gesture of a thumb, an index finger, or a ring finger, and in this case, the quantity N1 of the touch points that is corresponding to the hand gesture G is 1; the hand gesture of multiple fingers of a single hand may be a hand gesture of a combination of an index finger and a ring finger, and in this case, the quantity N1 of the touch points that is corresponding to the hand gesture G is 2. Optionally, the electromyographic signal collection device predefines a hand gesture set, and only a hand gesture in the set can be identified. The hand gesture in the set may include a common hand gesture in the art, or may be a predefined new hand gesture, which is not limited in this embodiment of the present disclosure.

The first touch start time T1 represents a start time of the electromyographic touch event Touch_EMG, and is the start time at which the user performs the touch operation and that is identified by the electromyographic signal collection device. The second touch start time T2 represents a start time of the track touch event Touch_TrackSys, and is the start time at which the user performs the touch operation and that is identified by the location capturing device.

The coordinate information L of each touch point represents location coordinates of N2 touch points that are identified by the location capturing device in a touch region, and L={l1, l2, . . . , lN2}, where li (i=1, 2, . . . , N2) represents two-dimensional coordinates of each touch point that are identified by the location capturing device.

Step 103: If it is determined that a time gap between a first touch start time and a second touch start time is less than a preset threshold, and a quantity of touch points that is corresponding to a hand gesture is the same as a quantity of touch points that is included in the second information, generate a touch instruction, where the touch instruction includes a device identifier of the electromyographic signal collection device, the hand gesture, and coordinate information of each touch point.

The preset threshold T_th may be set according to a requirement.

Specifically, the time gap T_gap between the first touch start time T1 in the electromyographic touch event Touch_EMG that is identified by the electromyographic signal collection device and the second touch start time T2 in the track touch event Touch_TrackSys that is identified by the location capturing device is equal to |T1−T2|; when the time gap T_gap is less than the preset threshold T_th, and the quantity N1 of the touch points that is corresponding to the hand gesture G in the electromyographic touch event Touch_EMG is the same as the quantity N2 of the touch points at which the user performs the touch in the track touch event Touch_TrackSys, that is, T_gap=|T1−T2|<T_th and N1=N2, it indicates that the electromyographic touch event Touch_EMG identified by the electromyographic signal collection device and the track touch event Touch_TrackSys identified by the location capturing device are a same touch operation event, and the touch instruction Touch_eff may be generated according to the touch operation. The touch instruction Touch_eff includes three parameters, which are respectively: the device identifier (device ID) of the electromyographic signal collection device, the hand gesture (G) in which the user performs the touch, and the coordinate information (L) of each touch point.

Optionally, the touch instruction Touch_eff may be a common touch instruction, such as selecting, moving, scaling, or rotating, or may be a newly added touch instruction, such as user-defined line drawing or volume adjustment, which is not limited in this embodiment of the present disclosure.

Step 105: Execute an interaction operation corresponding to the touch instruction.

Specifically, after the touch instruction Touch_eff is generated, the interaction operation corresponding to the touch instruction Touch_eff is performed.

It should be noted that the touch instruction Touch_eff includes the hand gesture G, and an additional feature may be defined for the hand gesture so as to enrich information included in the touch instruction Touch_eff. For example, when the hand gesture G is a gesture of a single finger of a single hand, different touch instructions Touch_eff may be generated according to different fingers, and it may be defined that a thumb represents object panning, an index finger represents selecting by means of tapping, and the like; when the hand gesture G is a gesture of a single finger of a single hand, and a generated touch instruction is line drawing, it may be defined that different fingers represent different colors or line types; or when the hand gesture G is a gesture of multiple fingers of a single hand, different touch instructions Touch_eff may be generated according to a combination of different fingers, and it may be defined that a thumb plus an index finger represents scaling, a thumb plus a ring finger represents brightness adjustment, an index finger plus a ring finger represents volume adjustment, and the like. A specific definition of the hand gesture G is not limited in this embodiment of the present disclosure.

Further, after step 105, the method may further include:

Step 107: Continuously receive the hand gesture in which a user performs a touch and that is sent by the electromyographic signal collection device, and the coordinate information of each touch point that is sent by the location capturing device; and update the touch instruction.

According to the touch interaction processing method provided in this embodiment of the present disclosure, a touch instruction is generated according to first information sent by an electromyographic signal collection device and second information sent by a location capturing device, and a corresponding interaction operation is performed. Because a device identifier of the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Optionally, in the foregoing embodiment, the first information may further include operating force at which the user performs the touch, and the touch instruction further includes the operating force.

The operating force (S) at which the user performs the touch is corresponding to the hand gesture G in which the user performs the touch, and represents a level of the operating force at which the user performs the touch operation. It may be understood that a valid touch operation necessarily has operating force, and if the operating force is excessively light, it may be understood that a touch operation is a touch performed by a user by accident in a touch region, and is not a valid touch operation. Optionally, the electromyographic signal collection device predefines a first preset threshold S_th(G) corresponding to each hand gesture G. When the operating force S corresponding to the hand gesture G is greater than the first preset threshold S_th(G) corresponding to the hand gesture G, it is considered that the hand gesture G is a valid hand gesture, and the touch operation is defined as the electromyographic touch event Touch_EMG. The first preset threshold S_th(G) may be set according to a requirement.

It should be noted that the touch instruction Touch_eff may include the operating force S, and an additional feature may be defined for the operating force S, so as to enrich information included in the touch instruction Touch_eff. For example, when the generated touch instruction Touch_eff is line drawing, it may be defined that a value of the operating force S represents a width of a line; or when the generated touch instruction Touch_eff is volume adjustment, it may be defined that a value of the operating force S represents a value of volume. A specific definition of the operating force S is not limited in this embodiment of the present disclosure.

Further, in the foregoing embodiment, after step 105, the method may further include:

Step 109: Continuously receive the hand gesture in which the user performs the touch and the operating force at which the user performs the touch that are sent by the electromyographic signal collection device, and the coordinate information of each touch point that is sent by the location capturing device; and update the touch instruction.

Step 111: If it is determined that the operating force is less than a second preset threshold, delete the touch instruction.

A processing device may predefine a second preset threshold S2_th(G) corresponding to each hand gesture G. When the operating force S corresponding to the hand gesture G is less than the second preset threshold S2_th(G) corresponding to the hand gesture G, it is considered that the touch instruction Touch_eff ends, and the touch instruction Touch_eff is deleted. The second preset threshold S2_th(G) may be set according to a requirement.

Optionally, step 111 may be performed before step 109.

Optionally, in the foregoing embodiment, the method may further include: maintaining a touch instruction list, so as to store the touch instruction. When a new touch instruction is generated, the touch instruction is added to the touch instruction list; and when it is determined that a touch instruction ends, the touch instruction is deleted from the touch instruction list.

Figure 2:
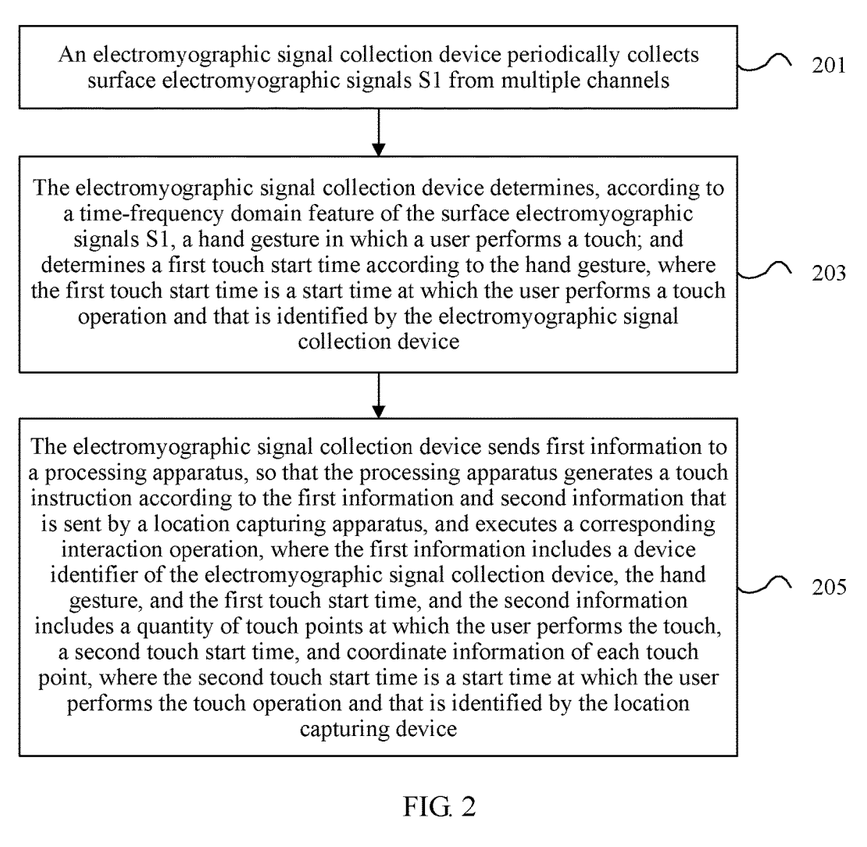
FIG. 2 is a flowchart of a second embodiment of a touch interaction processing method according to the present disclosure.

FIG. 2 is a flowchart of a second embodiment of a touch interaction processing method according to the present disclosure. The touch interaction processing method may be executed by an electromyographic signal collection device, for example, multiple electromyographic signal collection electrode plates, or an electromyographic signal collection device of a wrist-strap type. The electromyographic signal collection device may be any device that can collect a multichannel surface electromyographic signal, which is not limited in this embodiment of the present disclosure. In this embodiment, the electromyographic signal collection device may identify a touch operation event of a user, and may define the touch operation event of the user as an electromyographic touch event Touch_EMG. As shown in FIG. 2, the touch interaction processing method may include:

Step 201: An electromyographic signal collection device periodically collects surface electromyographic signals S1 from multiple channels.

The electromyographic signal collection device may include multiple electrodes that can collect surface electromyographic signals, and each electrode collects a surface electromyographic signal from one channel. When the user performs a multi-touch operation, the electromyographic signal collection device periodically collects the surface electromyographic signals S1 from the multiple channels. A collection period may be set according to a requirement. Optionally, pre-processing may be performed on the surface electromyographic signals S1 from the multiple channels. A pre-processing process may include: performing signal amplification processing, power frequency interference and trapping processing, filtering processing, or the like on the collected surface electromyographic signals S1 from the multiple channels.

Preferably, the electromyographic signal collection device may be disposed on an arm of the user. If both the left hand and the right hand of the user are used to perform a touch operation, an electromyographic signal collection device needs to be disposed on each arm. Each electromyographic signal collection device has a device identifier (device ID) corresponding to the electromyographic signal collection device. The device ID may be used to uniquely distinguish between electromyographic signal collection devices. The device ID may be a number, a letter, or in any other form, which is not limited in this embodiment of the present disclosure. When the user performs a multi-touch operation, the device identifier of the electromyographic signal collection device can be used to distinguish between one of touch operations that are performed by different users and a touch operation that is performed by a same user using the left hand and the right hand, such that it can be implemented that a single user performs a touch operation with two hands or multiple users simultaneously perform touch operations in a same region without causing a confusing touch operation.

Step 203: The electromyographic signal collection device determines, according to a time-frequency domain feature of the surface electromyographic signals S1, a hand gesture in which a user performs a touch; and determines a first touch start time according to the hand gesture. The first touch start time is a start time at which the user performs a touch operation and that is identified by the electromyographic signal collection device.

Optionally, that the electromyographic signal collection device determines, according to a time-frequency domain feature of the surface electromyographic signals S1, a hand gesture (G) in which a user performs a touch may specifically include:

The electromyographic signal collection device determines the hand gesture G according to an amplitude and a frequency that are of the surface electromyographic signals S1 based on a type of a hand gesture. Specifically, a type of the hand gesture G is determined using a linear discriminant analysis (Linear Discriminant Analysis, LDA for short) algorithm or a support vector machine (Support Vector Machine, SVM for short) algorithm. A method for determining the type of the hand gesture is not limited in this embodiment of the present disclosure.

The type of the hand gesture G may be a hand gesture of a single finger of a single hand, or may be a hand gesture of multiple fingers of a single hand. Each type of hand gesture G has a quantity N1 of touch points that is corresponding to the type of hand gesture G. For example, a quantity N1 of touch points that is corresponding to a gesture of a thumb of a single hand is 1, and a quantity N1 of touch points that is corresponding to a gesture of a combination of an index finger and a ring finger that are of a single hand is 2. The type of the hand gesture G is not limited in this embodiment of the present disclosure. Optionally, to identify a hand gesture, a hand gesture set is predefined, and only a hand gesture in the set can be identified. The hand gesture in the set may include a common hand gesture in the art, or may be a predefined new hand gesture, which is not limited in this embodiment of the present disclosure.

Optionally, the determining a first touch start time (T1) according to the hand gesture G may specifically include the following: after acquiring the hand gesture G, the electromyographic signal collection device defines the touch operation as the electromyographic touch event Touch_EMG, and acquires a current system time, and uses the current system time as the first touch start time T1 in the electromyographic touch event Touch_EMG.

Step 205: The electromyographic signal collection device sends first information to a processing device, such that the processing device generates a touch instruction according to the first information and second information that is sent by a location capturing device, and performs a corresponding interaction operation. The first information includes a device identifier of the electromyographic signal collection device, the hand gesture, and the first touch start time. The second information includes a quantity of touch points at which the user performs the touch, a second touch start time, and coordinate information of each touch point. The second touch start time is a start time at which the user performs the touch operation and that is identified by the location capturing device.

According to the touch interaction processing method provided in this embodiment of the present disclosure, an electromyographic signal collection device periodically collects surface electromyographic signals from multiple channels, determines a hand gesture of a touch operation, and determines a first touch start time according to the hand gesture. The electromyographic signal collection device sends first information that includes a device identifier, the hand gesture, and the first touch start time to a processing device, such that the processing device generates a touch instruction according to the first information and second information that is sent by a location capturing device, and performs a corresponding interaction operation. Because the device identifier of the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Optionally, in the foregoing embodiment, the method may further include: determining, by the electromyographic signal collection device according to the time-frequency domain feature of the surface electromyographic signals S1, operating force at which the user performs the touch. The first information further includes the operating force. The determining a first touch start time according to the hand gesture is determining the first touch start time according to the hand gesture and the operating force.

Optionally, the determining operating force (S) at which the user performs the touch may specifically include:

obtaining, by the electromyographic signal collection device, a single channel electromyographic signal S2 by performing superposition and averaging on the surface electromyographic signals S1, calculating an average amplitude of the single channel electromyographic signal S2 using a sliding time window, and using the average amplitude of the single channel electromyographic signal S2 as the operating force S.

The sliding time window includes a width I of the sliding time window and a sliding step J of the sliding time window. Values of the parameters may be set according to a requirement. Optionally, the sliding time window may further include a quantity of calculation times K of the sliding time window, where K is an integer greater than 1. The width I of the sliding time window represents obtaining an average amplitude Z1 by performing averaging on I values of the single channel electromyographic signal S2. The sliding step J of the sliding time window represents calculating an average amplitude of I values of the single channel electromyographic signal S2 at a regular time interval J. The quantity of the calculation times K of the sliding time window represents obtaining an average amplitude Z2 by performing averaging on K calculation results. The average amplitude Z1 or the average amplitude Z2 may be used as the operating force S. For example, it is set that I is five seconds, J is one second, and K is 3. Specific steps of the calculating an average amplitude of the single channel electromyographic signal S2 using a sliding time window, and the using the average amplitude of the single channel electromyographic signal S2 as the operating force S are: calculating an average amplitude Z1 of the single channel electromyographic signal S2 in five seconds, calculating an average amplitude Z1 every second, obtaining an average amplitude Z2 by performing averaging on three consecutive average amplitudes Z1, and using the average amplitude Z2 as the operating force S.

Optionally, the determining the first touch start time according to the hand gesture and the operating force may specifically include:

after the hand gesture G and the operating force S are acquired, determining the first touch start time T1 by looking up a table, where a first preset threshold S_th(G) of operating force corresponding to each hand gesture G is prestored in the table; and if the operating force S acquired according to the surface electromyographic signals S1 is greater than the first preset threshold S_th(G), acquiring a current system time, and using the current system time as the first touch start time T1.

In the predefined hand gesture set, a corresponding first preset threshold S_th(G) is predefined for each hand gesture G. The first preset threshold S_th(G) may be set according to a requirement. After the hand gesture G and the corresponding operating force S are acquired, if it is determined that the operating force S is greater than the first preset threshold S_th(G) corresponding to the hand gesture G, that is, S>S_th(G), it is considered that the touch operation is a valid touch operation, and the touch operation is defined as the electromyographic touch event Touch_EMG, and the current system time is acquired and used as the first touch start time T1 of the electromyographic touch event Touch_EMG.

Optionally, in the foregoing embodiment, that the processing device generates a touch instruction according to the first information and second information that is sent by a location capturing device includes: after determining that a time gap between the first touch start time and the second touch start time is less than a preset threshold, and a quantity of touch points that is corresponding to the hand gesture is the same as the quantity of the touch points that is included in the second information, the processing device generates the touch instruction. The touch instruction may include the device identifier of the electromyographic signal collection device, the hand gesture, and the coordinate information of each touch point. Optionally, the touch instruction may further include the operating force at which the user performs the touch.

It should be noted that the touch instruction includes the hand gesture G, and an additional feature may be defined for the hand gesture G, so as to enrich information included in the touch instruction. For example, when the hand gesture is a gesture of a single finger of a single hand, different touch instructions may be generated according to different fingers, and it may be defined that a thumb represents object panning, an index finger represents selecting by means of tapping, and the like; when the hand gesture is a gesture of a single finger of a single hand, and a generated touch instruction is line drawing, it may be defined that different fingers represent different colors or line types; or when the hand gesture is a gesture of multiple fingers of a single hand, different touch instructions may be generated according to a combination of different fingers, and it may be defined that a thumb plus an index finger represents scaling, an index finger plus a ring finger represents volume adjustment, and a thumb plus a ring finger represents brightness adjustment.

A specific definition of the hand gesture G is not limited in this embodiment of the present disclosure.

It should be noted that the touch instruction may further include the operating force S, and an additional feature may be defined for the operating force S, so as to enrich information included in the touch instruction. For example, when the generated touch instruction is line drawing, it may be defined that a value of the operating force represents a width of a line; or when the generated touch instruction is volume adjustment, it may be defined that a value of the operating force represents a value of volume. A specific definition of the operating force S is not limited in this embodiment of the present disclosure.

Figure 3:
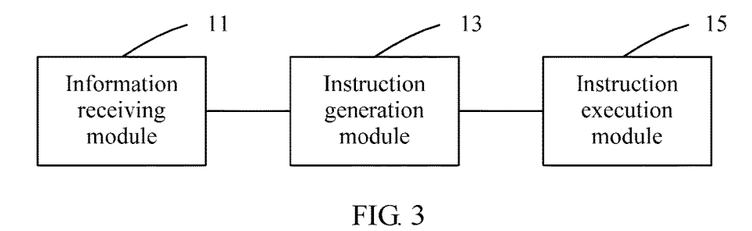
FIG. 3 is a schematic structural diagram of a first embodiment of a processing device according to the present disclosure.

FIG. 3 is a schematic structural diagram of a first embodiment of a processing device according to the present disclosure. As shown in FIG. 3, the processing device may include:

an information receiving module 11, configured to receive first information sent by an electromyographic signal collection device and second information sent by a location capturing device, where the first information includes a device identifier of the electromyographic signal collection device, a hand gesture in which a user performs a touch, and a first touch start time; the second information includes a quantity of touch points at which the user performs the touch, a second touch start time, and coordinate information of each touch point; the first touch start time is a start time at which the user performs a touch operation and that is identified by the electromyographic signal collection device; and the second touch start time is a start time at which the user performs the touch operation and that is identified by the location capturing device;

an instruction generation module 13, configured to: if it is determined that a time gap between the first touch start time and the second touch start time is less than a preset threshold, and a quantity of touch points that is corresponding to the hand gesture is the same as the quantity of the touch points that is included in the second information, generate a touch instruction, where the touch instruction includes the device identifier of the electromyographic signal collection device, the hand gesture, and the coordinate information of each touch point; and an instruction execution module 15, configured to perform an interaction operation corresponding to the touch instruction.

Further, the instruction generation module 13 is further configured to update the touch instruction according to the hand gesture in which the user performs the touch, that is sent by the electromyographic signal collection device, and that is continuously received by the information receiving module, and the coordinate information of each touch point that is sent by the location capturing device.

Optionally, the first information may further include operating force at which the user performs the touch, and the touch instruction may further include the operating force.

Optionally, the instruction generation module 13 is further configured to update the touch instruction according to the hand gesture in which the user performs the touch and the operating force at which the user performs the touch that are sent by the electromyographic signal collection device and that are continuously received by the information receiving module, and the coordinate information of each touch point that is sent by the location capturing device.

Optionally, the instruction generation module 13 is further configured to: if it is determined that the operating force is less than a second preset threshold, determine that the touch instruction ends, and delete the touch instruction.

Optionally, the electromyographic signal collection device my further include a storage module 17, configured to maintain a touch instruction list, and configured to store the touch instruction.

It should be noted that a form of the processing device is not limited in this embodiment of the present disclosure. The processing device may be a chip, a smartphone, a computer, a server, or the like, or may be another device that has a calculation or storage capability.

According to the processing device provided in this embodiment of the present disclosure, an information receiving module receives first information sent by an electromyographic signal collection device and second information sent by a location capturing device; an instruction generation module generates a touch instruction, where the touch instruction includes a device identifier of the electromyographic signal collection device, a hand gesture, and coordinate information of each touch point; and an instruction execution module performs an interaction operation corresponding to the touch instruction. Because the device identifier of the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Figure 4:
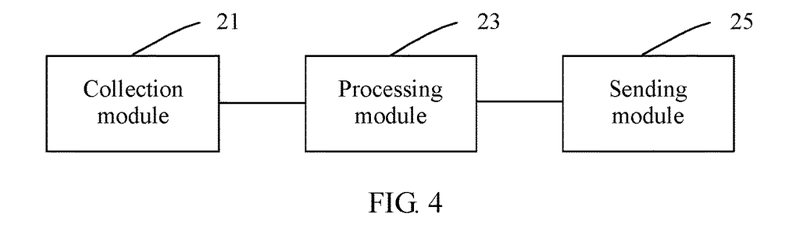
FIG. 4 is a schematic structural diagram of a first embodiment of an electromyographic signal collection device according to the present disclosure.

FIG. 4 is a schematic structural diagram of a first embodiment of an electromyographic signal collection device according to the present disclosure. As shown in FIG. 4, the electromyographic signal collection device may include:

a collection module 21, configured to periodically collect surface electromyographic signals S1 from multiple channels;

a processing module 23, configured to determine, according to a time-frequency domain feature of the surface electromyographic signals S1, a hand gesture in which a user performs a touch, and determine a first touch start time according to the hand gesture, where the first touch start time is a start time at which the user performs a touch operation and that is identified by the electromyographic signal collection device; and a sending module 25, configured to send first information to a processing device, such that the processing device generates a touch instruction according to the first information and second information that is sent by a location capturing device, and performs a corresponding interaction operation. The first information includes a device identifier of the electromyographic signal collection device, the hand gesture, and the first touch start time. The second information includes a quantity of touch points at which the user performs the touch, a second touch start time, and coordinate information of each touch point. The second touch start time is a start time at which the user performs the touch operation and that is identified by the location capturing device.

Optionally, that a processing module 23 determines, according to a time-frequency domain feature of the surface electromyographic signals S1, a hand gesture in which a user performs a touch includes: the processing module 23 determines the hand gesture according to an amplitude and a frequency that are of the surface electromyographic signals S1 based on a type of a hand gesture.

Optionally, the processing module 23 may be further configured to determine, according to the time-frequency domain feature of the surface electromyographic signals S1, operating force at which the user performs the touch. The first information further includes the operating force. Accordingly, the determining a first touch start time according to the hand gesture is determining the first touch start time according to the hand gesture and the operating force.

Optionally, that the processing module 23 determines operating force at which the user performs the touch may include: the processing module 23 obtains a single channel electromyographic signal S2 by performing superposition and averaging on the surface electromyographic signals S1, calculates an average amplitude of the single channel electromyographic signal S2 using a sliding time window, and uses the average amplitude of the single channel electromyographic signal S2 as the operating force S.

Optionally, that the processing module 23 determines the first touch start time according to the hand gesture and the operating force may include: after acquiring the hand gesture and the operating force, the processing module 23 determines the first touch start time by looking up a table, where a first preset threshold of operating force corresponding to each hand gesture is pre-stored in the table; and if the operating force acquired according to the surface electromyographic signals S1 is greater than the first preset threshold, acquiring a current system time, and using the current system time as the first touch start time.

Optionally, that the processing device generates a touch instruction according to the first information and second information that is sent by a location capturing device may include: after determining that a time gap between the first touch start time and the second touch start time is less than a preset threshold, and a quantity of touch points that is corresponding to the hand gesture is the same as the quantity of the touch points that is included in the second information, the processing device generates the touch instruction. The touch instruction may include the device identifier of the electromyographic signal collection device, the hand gesture, and the coordinate information of each touch point. Optionally, the touch instruction may further include the operating force at which the user performs the touch.

It should be noted that a form of the electromyographic signal collection device is not limited in this embodiment of the present disclosure. The electromyographic signal collection device may be in a form of a wearable device, such as a wrist strap, or a watch, or may be multiple electrodes that can collect a surface electromyographic signal.

According to the electromyographic signal collection device provided in this embodiment of the present disclosure, a collection module collects surface electromyographic signals S1 from multiple channels; a processing module determines a hand gesture in which a user performs a touch and a first touch start time; and a sending module sends first information to a processing device, such that the processing device generates a touch instruction according to the first information and second information that is sent by a location capturing device, and performs a corresponding interaction operation, where the touch instruction includes a device identifier of the electromyographic signal collection device, the hand gesture, and coordinate information of each touch point. Because the device identifier corresponding to the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Figure 5:
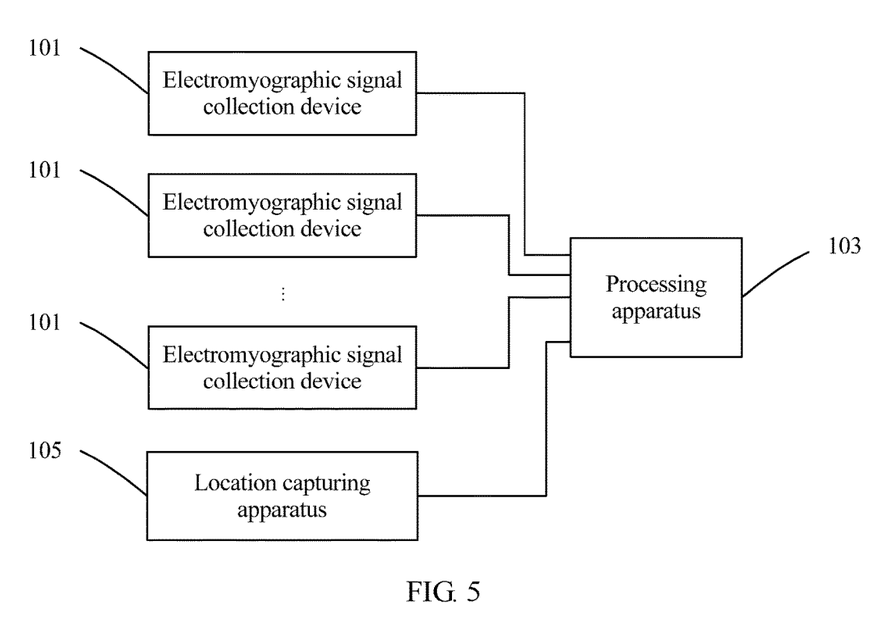
FIG. 5 is a schematic structural diagram of a first embodiment of a touch processing system according to the present disclosure.

FIG. 5 is a schematic structural diagram of a first embodiment of a touch processing system according to the present disclosure. As shown in FIG. 5, the touch processing system may include a location capturing device 105, a processing device 103, and at least one electromyographic signal collection device 101. The location capturing device 105 may be any existing device that can acquire a quantity of touch points of a touch operation, a touch start time, and coordinates of a touch point. The processing device 103 may use a structure of the device embodiment in FIG. 3, and accordingly, may execute the technical solution of the method embodiment in FIG. 1. The electromyographic signal collection device 101 may use a structure of the device embodiment in FIG. 4, and accordingly, may execute the technical solution of the method embodiment in FIG. 2.

The electromyographic signal collection device 101 and the location capturing device 105 are both communicatively connected to the processing device 103. The electromyographic signal collection device 101 and the location capturing device 105 may separately communicate with the processing device 103 using a wired network, a wireless network, Bluetooth, WiFi, or the like.

Optionally, the location capturing device 105 may include a capacitive sensing module 1031, an infrared sensing module 1033, and an ultrasonic sensing module 1035. The capacitive sensing module 1031 is configured to obtain the quantity of the touch points of the touch operation, the touch start time, and the coordinates of the touch point using a capacitive touchscreen. The infrared sensing module 1033 is configured to obtain the quantity of the touch points of the touch operation, the touch start time, and the coordinates of the touch point using an infrared touch sensing system. The ultrasonic sensing module 1035 is configured to obtain the quantity of the touch points of the touch operation, the touch start time, and the coordinates of the touch point using an ultrasonic touch sensing system.

Optionally, the location capturing device 105 and the processing device 103 may be integrated, or may be independently disposed.

Optionally, the touch processing system may further include a user feedback apparatus 107, configured to display an execution result of a touch instruction; for example, the user feedback apparatus 107 is an LED display screen, a projector display device, a loudspeaker, or a tactile feedback apparatus. Optionally, the user feedback apparatus 107 may include a display module 1071, a sound module 1073, and a tactile feedback module 1075.

It should be noted that the touch processing system provided in this embodiment of the present disclosure may be applied to a traditional electronic touch device, such as a touch mobile phone, or a touch computer, or may be applied to multiple fields, such as education, enterprise office, entertainment, and advertisement display; for example, a desktop of a desk is used for art teaching, the desktop of the desk is used as a painting paper, a finger is used as a painting pen, and multiple students complete one painting together on the painting paper.

Figure 6:
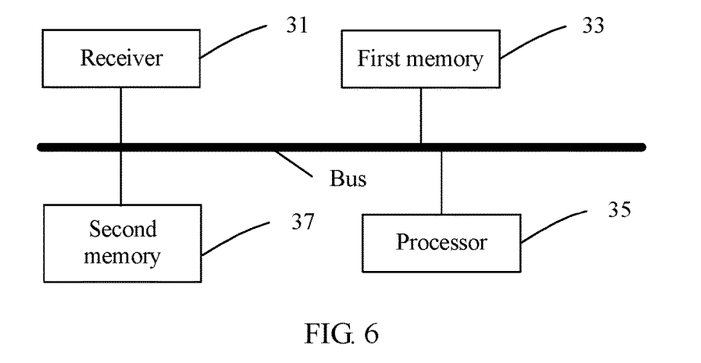
FIG. 6 is a schematic structural diagram of a first embodiment of a processing device according to the present disclosure.

FIG. 6 is a schematic structural diagram of a first embodiment of a processing device according to the present disclosure. As shown in FIG. 6, the processing device may include a receiver 31, a first memory 33, and a processor 35, where the receiver 31 and the first memory 33 are separately connected to the processor 35 using a bus.

The receiver 31 is configured to receive first information sent by an electromyographic signal collection device and second information sent by a location capturing device. The first information includes a device identifier of the electromyographic signal collection device, a hand gesture in which a user performs a touch, and a first touch start time. The second information includes a quantity of touch points at which the user performs the touch, a second touch start time, and coordinate information of each touch point. The first touch start time is a start time at which the user performs a touch operation and that is identified by the electromyographic signal collection device. The second touch start time is a start time at which the user performs the touch operation and that is identified by the location capturing device.

The first memory 33 is configured to store an instruction.

The processor 35 is configured to run the instruction stored in the first memory 33, so as to perform the following steps:

If it is determined that a time gap between the first touch start time and the second touch start time is less than a preset threshold, and a quantity of touch points that is corresponding to the hand gesture is the same as the quantity of the touch points that is included in the second information, generate a touch instruction, where the touch instruction includes the device identifier of the electromyographic signal collection device, the hand gesture, and the coordinate information of each touch point; and perform an interaction operation corresponding to the touch instruction.

Optionally, the processor 35 may be further configured to perform the following step: update the touch instruction according to the hand gesture in which the user performs the touch, that is sent by the electromyographic signal collection device, and that is continuously received by an information receiving module, and the coordinate information of each touch point that is sent by the location capturing device.

Optionally, the first information may further include operating force at which the user performs the touch, and the touch instruction may further include the operating force.

Optionally, the processor 35 may be further configured to: update the touch instruction according to the hand gesture in which the user performs the touch and the operating force at which the user performs the touch that are sent by the electromyographic signal collection device and that are continuously received by the information receiving module, and the coordinate information of each touch point that is sent by the location capturing device.

Optionally, the processor 35 may be further configured to: if it is determined that the operating force is less than a second preset threshold, determine that the touch instruction ends, and delete the touch instruction.

Optionally, the processing device may further include a second memory 37, configured to maintain a touch instruction list, where the touch instruction is stored in the touch instruction list. The second memory 37 is connected to the processor 35 using a bus.

It should be noted that a form of the processing device is not limited in this embodiment of the present disclosure. The processing device may be a chip, a smartphone, a computer, a server, or the like, or may be another device that has a calculation or storage capability.

According to the processing device provided in this embodiment of the present disclosure, a receiver receives first information sent by an electromyographic signal collection device and second information sent by a location capturing device; and a processor generates a touch instruction and performs an interaction operation corresponding to the touch instruction, where the touch instruction includes a device identifier of the electromyographic signal collection device, a hand gesture, and coordinate information of each touch point. Because the device identifier of the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Figure 7:
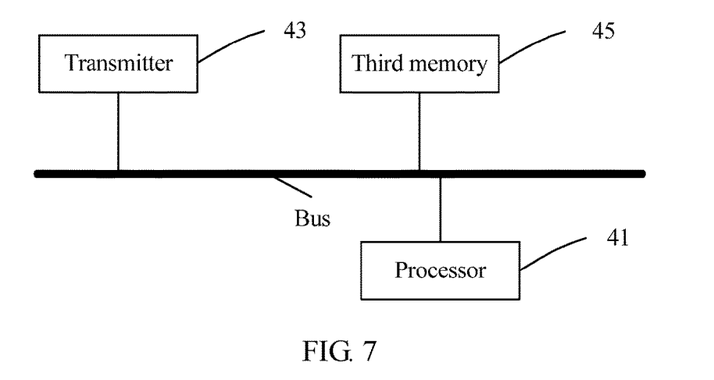
FIG. 7 is a schematic structural diagram of a first embodiment of an electromyographic signal collection device according to the present disclosure.

FIG. 7 is a schematic structural diagram of a first embodiment of an electromyographic signal collection device according to the present disclosure. As shown in FIG. 7, the electromyographic signal collection device may include a processor 41, a transmitter 43, and a third memory 45, where the transmitter 43 and the third memory 45 are separately connected to the processor 41 using a bus.

The third memory 45 is configured to store an instruction.

The processor 41 is configured to run the instruction stored in the third memory 45, so as to perform the following steps:

periodically collect surface electromyographic signals S1 from multiple channels; and determine, according to a time-frequency domain feature of the surface electromyographic signals S1, a hand gesture in which a user performs a touch, and determine a first touch start time according to the hand gesture, where the first touch start time is a start time at which the user performs a touch operation and that is identified by the electromyographic signal collection device.

Optionally, the determining, according to a time-frequency domain feature of the surface electromyographic signals S1, a hand gesture in which a user performs a touch may include: determining the hand gesture according to an amplitude and a frequency that are of the surface electromyographic signals S1 based on a type of a hand gesture.

The transmitter 43 is configured to send first information to a processing device, such that the processing device generates a touch instruction according to the first information and second information that is sent by a location capturing device, and performs a corresponding interaction operation. The first information includes a device identifier of the electromyographic signal collection device, the hand gesture, and the first touch start time. The second information includes a quantity of touch points at which the user performs the touch, a second touch start time, and coordinate information of each touch point. The second touch start time is a start time at which the user performs the touch operation and that is identified by the location capturing device.

Optionally, the processor 41 may be further configured to perform the following steps: determine, according to the time-frequency domain feature of the surface electromyographic signals S1, operating force at which the user performs the touch. The first information further includes the operating force. Accordingly, the determining a first touch start time according to the hand gesture is determining the first touch start time according to the hand gesture and the operating force.

Optionally, the determining operating force at which the user performs the touch may include: obtaining a single channel electromyographic signal S2 by performing superposition and averaging on the surface electromyographic signals S1, calculating an average amplitude of the single channel electromyographic signal S2 using a sliding time window, and using the average amplitude of the single channel electromyographic signal S2 as the operating force S.

Optionally, the determining the first touch start time according to the hand gesture and the operating force may include: after acquiring the hand gesture and the operating force, determining the first touch start time by looking up a table, where a first preset threshold of operating force corresponding to each hand gesture is pre-stored in the table; and if the operating force acquired according to the surface electromyographic signals S1 is greater than the first preset threshold, acquiring a current system time, and using the current system time as the first touch start time.

Optionally, that the processing device generates a touch instruction according to the first information and second information that is sent by a location capturing device may include: after determining that a time gap between the first touch start time and the second touch start time is less than a preset threshold, and a quantity of touch points that is corresponding to the hand gesture is the same as the quantity of the touch points that is included in the second information, the processing device generates the touch instruction. The touch instruction may include the device identifier of the electromyographic signal collection device, the hand gesture, and the coordinate information of each touch point. Optionally, the touch instruction may further include the operating force at which the user performs the touch.

It should be noted that a form of the electromyographic signal collection device is not limited in this embodiment of the present disclosure. The electromyographic signal collection device may be in a form of a wearable device, such as a wrist strap, or a watch, or may be multiple electrodes that can collect a surface electromyographic signal.

According to the electromyographic signal collection device provided in this embodiment of the present disclosure, a processor collects surface electromyographic signals S1 from multiple channels, and determines a hand gesture in which a user performs a touch and a first touch start time; and a transmitter sends first information to a processing device, such that the processing device generates a touch instruction according to the first information and second information that is sent by a location capturing device, and performs a corresponding interaction operation, where the touch instruction includes a device identifier of the electromyographic signal collection device, the hand gesture, and coordinate information of each touch point. Because the device identifier corresponding to the electromyographic signal collection device may be used to distinguish between one of touch operations that are performed by different users and a touch operation that is performed by a same user using the left hand and the right hand, it can be implemented that a single user performs a touch operation with two hands or multiple users simultaneously perform touch operations in a same region without causing a confusing touch instruction.

Figure 8:
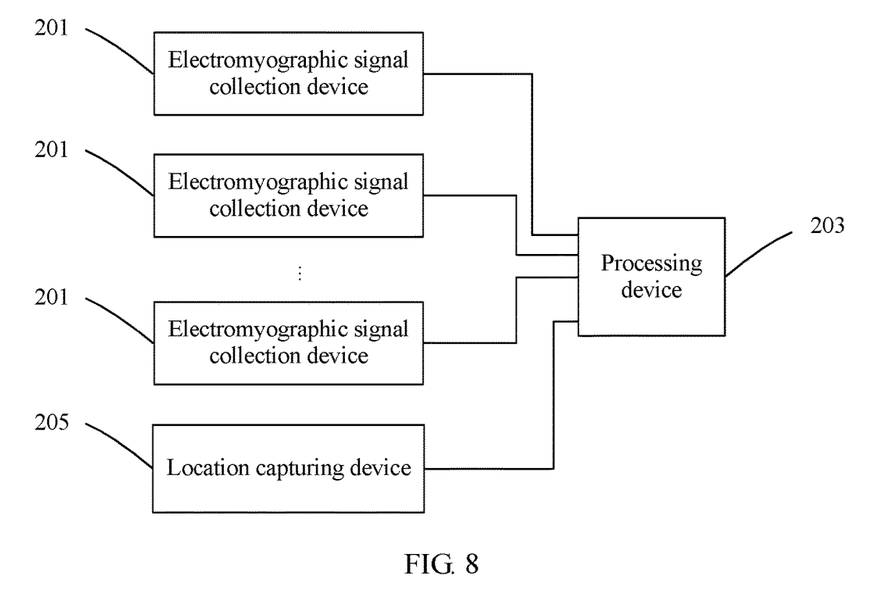
FIG. 8 is a schematic structural diagram of a second embodiment of a touch processing system according to the present disclosure.

FIG. 8 is a schematic structural diagram of a second embodiment of a touch processing system according to the present disclosure. As shown in FIG. 8, the touch processing system may include a location capturing device 205, a processing device 203, and at least one electromyographic signal collection device 201. The location capturing device 205 may be any existing device that can acquire a quantity of touch points of a touch operation, a touch start time, and coordinates of a touch point. The processing device 203 may use a structure of the device embodiment in FIG. 6, and accordingly, may execute the technical solution of the method embodiment in FIG. 1. The electromyographic signal collection device 201 may use a structure of the device embodiment in FIG. 7, and accordingly, may execute the technical solution of the method embodiment in FIG. 2.

The electromyographic signal collection device 201 and the location capturing device 205 are both communicatively connected to the processing device 203. The electromyographic signal collection device 201 and the location capturing device 205 may separately communicate with the processing device 203 using a wired network, a wireless network, Bluetooth, WiFi, or the like.

Optionally, the location capturing device 205 may include a capacitive sensor 2031, an infrared sensor 2033, and an ultrasonic sensor 2035. The capacitive sensor 2031 is configured to obtain the quantity of the touch points of the touch operation, the touch start time, and the coordinates of the touch point using a capacitive touchscreen. The infrared sensor 2033 is configured to obtain the quantity of the touch points of the touch operation, the touch start time, and the coordinates of the touch point using an infrared touch sensing system. The ultrasonic sensor 2035 is configured to obtain the quantity of the touch points of the touch operation, the touch start time, and the coordinates of the touch point using an ultrasonic touch sensing system.

Optionally, the location capturing device 205 and the processing device 203 may be integrated, or may be independently disposed.

Optionally, the touch processing system may further include a user feedback device 207, configured to display an execution result of a touch instruction; for example, the user feedback device 207 is an LED display screen, a projector display device, a loudspeaker, or a tactile feedback device. Optionally, the user feedback device 207 may include a display device 2071, a sound device 2073, and a tactile feedback device 2075.

It should be noted that the touch processing system provided in this embodiment of the present disclosure may be applied to a traditional electronic touch device, such as a touch mobile phone, or a touch computer, or may be applied to multiple fields, such as education, enterprise office, entertainment, and advertisement display; for example, a desktop of a desk is used for art teaching the desktop of the desk is used as a painting paper, a finger is used as a painting pen, and multiple students complete one painting together on the painting paper.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. A touch interaction processing method, comprising:
receiving first information sent by an electromyographic signal collection device and second information sent by a location capturing device, wherein the first information comprises a device identifier of the electromyographic signal collection device, a hand gesture in which a user performs a touch, and a first touch start time; the second information comprises a quantity of touch points at which the user performs the touch, a second touch start time, and coordinate information of each touch point; the first touch start time is a start time at which the user performs a touch operation and that is identified by the electromyographic signal collection device; and the second touch start time is a start time at which the user performs the touch operation and that is identified by the location capturing device;

generating a touch instruction when it is determined that a time gap between the first touch start time and the second touch start time is less than a preset threshold, and a quantity of touch points that is corresponding to the hand gesture is the same as the quantity of the touch points that is comprised in the second information, wherein the touch instruction comprises the device identifier of the electromyographic signal collection device, the hand gesture, and the coordinate information of each touch point; and performing an interaction operation corresponding to the touch instruction.

2. The method according to claim 1, wherein the method further comprises:

continuously receiving the hand gesture in which the user performs the touch and that is sent by the electromyographic signal collection device, and the coordinate information of each touch point that is sent by the location capturing device; and updating the touch instruction.

3. The method according to claim 1, wherein the first information further comprises operating force at which the user performs the touch, and the touch instruction further comprises the operating force.

4. The method according to claim 3, wherein the method further comprises: continuously receiving the hand gesture in which the user performs the touch and the operating force at which the user performs the touch that are sent by the electromyographic signal collection device, and the coordinate information of each touch point that is sent by the location capturing device; and updating the touch instruction.

5. The method according to claim 4, wherein the method further comprises:

deleting the touch instruction when it is determined that the operating force is less than a second preset threshold.

6. A touch interaction processing method, comprising:

periodically collecting, by an electromyographic signal collection device, surface electromyographic signals S1 from multiple channels;

determining, by the electromyographic signal collection device according to a time-frequency domain feature of the surface electromyographic signals S1, a hand gesture in which a user performs a touch; and determining a first touch start time according to the hand gesture, wherein the first touch start time is a start time at which the user performs a touch operation and that is identified by the electromyographic signal collection device; and sending, by the electromyographic signal collection device, first information to a processing device, such that the processing device generates a touch instruction according to the first information and second information that is sent by a location capturing device, and performs a corresponding interaction operation, wherein the first information comprises a device identifier of the electromyographic signal collection device, the hand gesture, and the first touch start time; the second information comprises a quantity of touch points at which the user performs the touch, a second touch start time, and coordinate information of each touch point; and the second touch start time is a start time at which the user performs the touch operation and that is identified by the location capturing device.

7. The method according to claim 6, wherein the determining, by the electromyographic signal collection device according to a time-frequency domain feature of the surface electromyographic signals S1, a hand gesture in which a user performs a touch comprises:

determining, by the electromyographic signal collection device, the hand gesture according to an amplitude and a frequency that are of the surface electromyographic signals S1 based on a type of a hand gesture.

8. The method according to claim 6, further comprising:

determining, by the electromyographic signal collection device according to the time-frequency domain feature of the surface electromyographic signals S1, operating force at which the user performs the touch, wherein the first information further comprises the operating force, and the determining a first touch start time according to the hand gesture is determining the first touch start time according to the hand gesture and the operating force.

9. The method according to claim 8, wherein the determining operating force at which the user performs the touch comprises:

obtaining, by the electromyographic signal collection device, a single channel electromyographic signal S2 by performing superposition and averaging on the surface electromyographic signals S1, calculating an average amplitude of the single channel electromyographic signal S2 using a sliding time window, and using the average amplitude of the single channel electromyographic signal S2 as the operating force S.

10. The method according to claim 8, wherein the determining the first touch start time according to the hand gesture and the operating force comprises:

determining the first touch start time by looking up a table after acquiring the hand gesture and the operating force, wherein a first preset threshold of operating force corresponding to each hand gesture is pre-stored in the table; and acquiring a current system time when the operating force acquired according to the surface electromyographic signals S1 is greater than the first preset threshold, and using the current system time as the first touch start time.

11. A processing device, comprising:

a non-transitory memory configured to store instructions; and a processor coupled to the memory and configured to execute the instructions to:

receive first information sent by an electromyographic signal collection device and second information sent by a location capturing device, wherein the first information comprises a device identifier of the electromyographic signal collection device, a hand gesture in which a user performs a touch, and a first touch start time; the second information comprises a quantity of touch points at which the user performs the touch, a second touch start time, and coordinate information of each touch point; the first touch start time is a start time at which the user performs a touch operation and that is identified by the electromyographic signal collection device; and the second touch start time is a start time at which the user performs the touch operation and that is identified by the location capturing device;

generate a touch instruction when it is determined that a time gap between the first touch start time and the second touch start time is less than a preset threshold, and a quantity of touch points that is corresponding to the hand gesture is the same as the quantity of the touch points that is comprised in the second information, wherein the touch instruction comprises the device identifier of the electromyographic signal collection device, the hand gesture, and the coordinate information of each touch point; and perform an interaction operation corresponding to the touch instruction.

12. The device according to claim 11, wherein the processor is further configured to:

continuously receive the hand gesture in which the user performs the touch and that is sent by the electromyographic signal collection device, and the coordinate information of each touch point that is sent by the location capturing device; and update the touch instruction.

13. The device according to claim 11, wherein the first information further comprises operating force at which the user performs the touch, and the touch instruction further comprises the operating force.

14. The device according to claim 13, wherein the processor is further configured to:

continuously receive the hand gesture in which the user performs the touch and the operating force at which the user performs the touch that are sent by the electromyographic signal collection device, and the coordinate information of each touch point that is sent by the location capturing device; and update the touch instruction.

15. The device according to claim 14, wherein the processor is further configured to:

delete the touch instruction when it is determined that the operating force is less than a second preset threshold.

16. A touch interaction processing device, comprising:
a non-transitory memory configured to store instructions; and
a processor coupled to the memory and configured to execute the instructions to:
periodically collect surface electromyographic signals S1 from multiple channels;
determine, according to a time-frequency domain feature of the surface electromyographic signals S1, a hand gesture in which a user performs a touch; and
determine a first touch start time according to the hand gesture, wherein the first touch start time is a start time at which the user performs a touch operation and that is identified by the electromyographic signal collection device; and send first information to a processing device, such that the processing device generates a touch instruction according to the first information and second information that is sent by a location capturing device, and performs a corresponding interaction operation, wherein the first information comprises a device identifier of the electromyographic signal collection device, the hand gesture, and the first touch start time; the second information comprises a quantity of touch points at which the user performs the touch, a second touch start time, and coordinate information of each touch point; and the second touch start time is a start time at which the user performs the touch operation and that is identified by the location capturing device.

17. The device according to claim 16, wherein the processor is configured to:

determining the hand gesture according to an amplitude and a frequency that are of the surface electromyographic signals S1 based on a type of a hand gesture.

18. The device according to claim 16, wherein the processor is further configured to: determine, according to the time-frequency domain feature of the surface electromyographic signals S1, operating force at which the user performs the touch, wherein the first information further comprises the operating force, and the processor is further configured to: determine the first touch start time according to the hand gesture and the operating force.

19. The device according to claim 18, wherein the processor is configured to:

obtain a single channel electromyographic signal S2 by performing superposition and averaging on the surface electromyographic signals S1, calculate an average amplitude of the single channel electromyographic signal S2 using a sliding time window, and using the average amplitude of the single channel electromyographic signal S2 as the operating force S.

20. The device according to claim 18, wherein the processor is configured to:

determine the first touch start time by looking up a table after acquiring the hand gesture and the operating force, wherein a first preset threshold of operating force corresponding to each hand gesture is pre-stored in the table; and acquire a current system time when the operating force acquired according to the surface electromyographic signals S1 is greater than the first preset threshold, and use the current system time as the first touch start time.

* * * * *